Jan. 20, 1948.                F. W. PARKHILL                2,434,863
                                  CASTER
                           Filed July 30, 1943
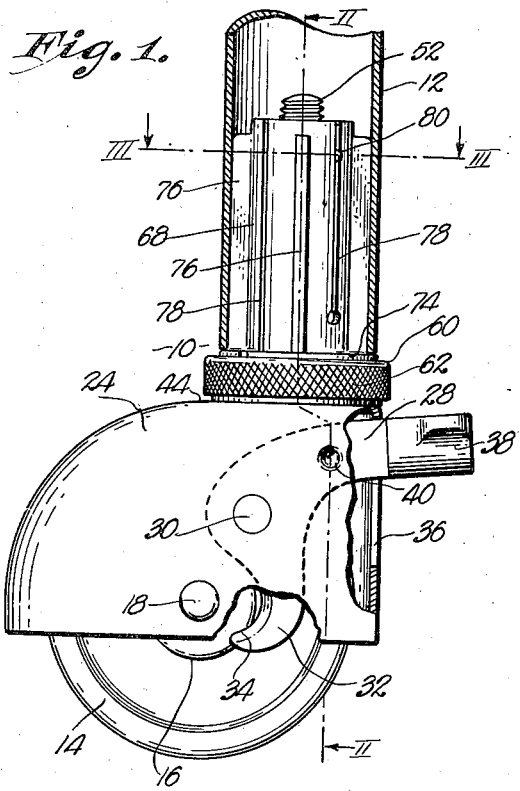
Fig. 1.
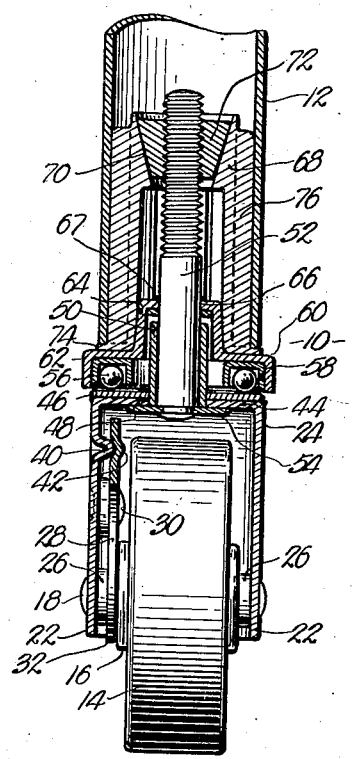
Fig. 2.
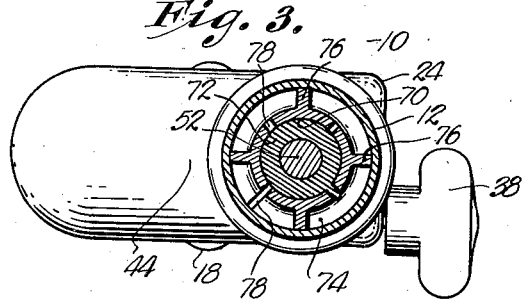
Fig. 3.
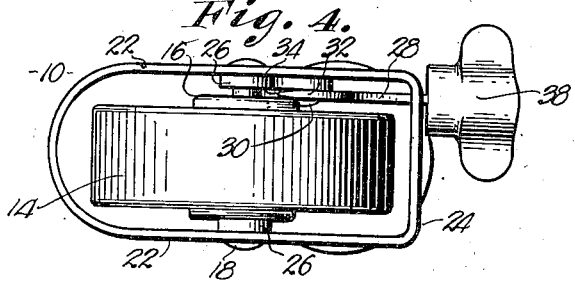
Fig. 4.
Fig. 5.
INVENTOR.
Frederic W. Parkhill
BY
ATTORNEY.

Patented Jan. 20, 1948

2,434,863

UNITED STATES PATENT OFFICE 2,434,863

CASTER

Frederic W. Parkhill, Wichita, Kans., assignor of one-fourth to Harman R. Brown and one-fourth to Walter E. Ludwig, both of Kansas City, Mo.

Application July 30, 1943, Serial No. 496,756

3 Claims. (Cl. 16—35)

This invention relates to casters and more particularly to caster assemblies of the type having expansible portions for engaging the cavities or hollow legs of furniture or the like, to secure the caster in assembled condition therewith.

One of the important aims of this invention is to provide a caster asembly having a unitary, expansible portion constructed to tightly grip, throughout its entire length, the inner surface of a hollow leg or cavity of an article of furniture.

It is a further object of the instant invention to provide a caster assembly having a simple yet effective brake incorporated therein, for locking the wheel of the caster against rotation.

A yet further aim of the invention is the provision of a caster assembly wherein the support for the brake and wheel substantially encloses these parts to enhance the appearance of the assembly and to prevent, to a large extent, the winding of lint or ravelings around the shaft of the caster wheel.

Other objects will appear during the course of the following specification, referring to the accompanying drawings, wherein:

Fig. 1 is a side elevational view of a caster assembly constructed in accordance with this invention, and mounted in operable position in a furniture leg, shown fragmentarily and in section.

Fig. 2 is a vertical section taken on line II—II of Fig. 1 and looking in the direction of the arrows.

Fig. 3 is a horizontal section taken on line III—III of Fig. 1.

Fig. 4 is an inverted plan view of the caster assembly; and

Fig. 5 is a fragmentary section on a central vertical line of Fig. 1, but showing the brake in wheel-locking position.

For illustrative purposes, the caster assembly generally designated by the numeral 10, is shown in operable position in the lower end of a hollow, cylindrical member 12 representing the leg of a piece of furniture.

The caster assembly includes a wheel 14, provided with a hub 16 and mounted on a shaft 18 extended transversely through aligned openings 20, formed in spaced walls 22 of a hood or casing 24. Walls 22 are preferably reinforced by bosses 26 around openings 20 to provide extended bearing surfaces for shaft 18.

A brake arm 28 pivotally mounted on one of the casing walls 22 by a pin 30 at a point spaced above the axis of wheel 14, terminates at one end in a finger 32 having a tapered leading edge 34. As clearly shown in Figs. 4 and 5, the tapered edge 34 of finger 32 serves as a wedge to facilitate entrance of the finger between one end face of hub 16 and a similar side face of the adjacent boss 26 when the brake is swung about its pivot 30 to wheel-locking position. The oposite end of brake arm 28 extends through an elongated slot 36 formed in casing 24 and terminates in a winged boss 38 to provide a relatively large surface for the application of a foot to operate the brake.

In order to prevent accidental movement of brake arm 28 to wheel-engaging position by action of gravity, aligned indentures 40 and 42 are provided in wall 22 and arm 28 respectively, the inherent resiliency of arm 28 tending to maintain frictional engagement of one indentation with the other. A wall 44 closes the upper end of hood 24 and is provided with a planar horizontal portion reinforced by a washer 46 in integral relation therewith. Openings 48 are provided in the combined horizontal portion and washer 46 for receiving a sleeve 50 surrounding the lower end of a bolt or shank 52. The extreme lower end of bolt 52 is reduced in diameter for the reception of a washer 54 held thereon by riveting the reduced end as shown in Fig. 2, washer 54 frictionally bearing against the lower face of top wall 44 while sleeve 50, rigid to wall 44, likewise embraces a substantial part of the lower portion of bolt 52.

It will be noted from Fig. 2 that washer 46 serves as a lower race for a circular series of bearing balls 56 mounted in an upper race 58, which in turn is seated in a retainer 60 having a depending annular flange 62 surrounding the upper race and roughened on its outer surface for a purpose presently disclosed. The central portion 64 of retainer 60 is upset and is closed except for an opening 66 formed therein to receive bolt 52. Any suitable means such as welding, indicated at 67, may be employed to secure the retainer 60 to bolt 52. The outer surface of upset portion 64 is slightly tapered upwardly as clearly shown in Fig. 2 to enter the recessed lower end of an expansible jaw member 68. A conical recess 70 in the upper end of member 68 is adapted to receive an expander nut 72 threadedly engaging bolt 52.

As will be observed, jaw member 68 is unitary in construction and is provided with a radial bottom flange 74 and a plurality of parallel vertical ribs 76. Intervening slots 78 extend between ribs 76 through a greater portion of the length of jaw member 68, one of said slots extending throughout the entire length of the jaw member to split the latter. A protuberance 80 on expander nut 72 is dimensioned to ride in one of the slots 78 for preventing rotative movement of nut 72 relative to jaw member 68.

When preparing to mount a caster constructed as above described, in the hollow leg of a piece of furniture, the expander nut 72 is first turned in bolt 52 to withdraw said nut from recess 70, thereby removing any expanding force which might be exerted on jaw member 68. The latter is then inserted in the leg with ribs 76 in slight frictional engagement with the inner surface of the annular leg wall. Such friction is sufficient to prevent rotation of the jaw member. Retainer 60 is then turned to cause expander nut 72 to be threaded onto bolt 52, thus forcing the lower end of jaw member 68 farther onto the tapered outer face of upset portion 64, thereby expanding the lower end of the jaw member. Simultaneously therewith, nut 72 moves deeper into conical recess 70 to expand the upper end of member 68. The roughened outer surface of flange 62 affords sufficient gripping area to cause firm engagement of the ribs 76 throughout their length with leg 12.

Relatively light pressure on boss 38 of brake arm 28 overcomes the friction set up between indentures 40 and 42 and causes finger 32 of the brake arm to move between boss 26 and the hub 16 of wheel 14. The procedure of releasing the brake and of removing the caster assembly from the furniture leg, should it be found desirable to do so, will be obvious from the foregoing.

While only one embodiment of the invention has been shown and described, it is conceivable that various modifications might be made without departing from the spirit of this invention, and it is desired therefore, to be limited only by the scope of the appended claims.

Having thus described the invention, what is claimed as new and desired to be secured by Letters Patent is:

1. In a caster wheel assembly having a tubular radially expansible jaw adapted to fit into a tubular member, and a wheel casing; means for interconnecting the said jaw and the casing unit, comprising a threaded bolt extending longitudinally through the tubular member; an expander nut on the bolt at one end of the jaw; a cupped retainer having a perforated, tapered boss on the bottom thereof secured to the bolt with the latter passed through the perforation; a sleeve rigid to the said casing, circumscribing the bolt and in telescoping relation with the boss; and a bearing carried within the retainer to rest upon the said casing.

2. In a caster wheel assembly having a tubular radially expansible jaw adapted to fit into a tubular member, and a wheel casing; means for interconnecting the said jaw and the casing unit, comprising a threaded bolt extending longitudinally through the tubular member; an expander nut on the bolt at one end of the jaw; a cupped retainer having a perforated, tapered boss on the bottom thereof secured to the bolt with the latter passed through the perforation; a sleeve rigid to the said casing, circumscribing the bolt and in telescoping relation with the boss; and a bearing carried within the retainer to rest upon the said casing, said retainer and the bolt being rotatable as a unit to draw the expander nut and said tapered boss toward each other to expand the jaw.

3. In a caster wheel assembly having a tubular radially expansible jaw adapted to fit into a tubular member, and a wheel casing; means for interconnecting the said jaw and the casing unit, comprising a threaded bolt extending longitudinally through the tubular member; an expander nut on the bolt at one end of the jaw; a cupped retainer having a perforated, tapered boss on the bottom thereof secured to the bolt with the latter passed through the perforation; a sleeve rigid to the said casing, circumscribing the bolt and in telescoping relation with the boss; and a bearing carried within the retainer to rest upon the said casing, said retainer and the bolt being rotatable as a unit to draw the expander nut and said tapered boss toward each other to expand the jaw, said sleeve having its inner end spaced from the bottom of the retainer whereby the load on the said assembly is carried by the bearing.

FREDERIC W. PARKHILL.

REFERENCES CITED

The following references are of record in the file of this patent:

UNITED STATES PATENTS

| Number | Name | Date |
| --- | --- | --- |
| 1,922,099 | Kilian | Aug. 15, 1933 |
| 1,927,271 | Noelting et al. | Sept. 19, 1933 |
| 1,863,349 | Noelting et al. | June 14, 1932 |
| 1,671,774 | McIntosh | May 29, 1928 |
| 1,953,636 | Skelton | Apr. 3, 1934 |
| 1,138,345 | Zifferer | May 4, 1915 |
| 570,786 | Church | Nov. 3, 1896 |
| 945,403 | Mohun | Jan. 4, 1910 |